United States Patent [19]

Kampen

[11] Patent Number: 5,410,021

[45] Date of Patent: Apr. 25, 1995

[54] RECOVERY OF PROTEIN, PROTEIN ISOLATE AND/OR STARCH FROM CEREAL GRAINS

[75] Inventor: Willem H. Kampen, Charlotte, N.C.

[73] Assignee: Energenetics, Inc., Fort Madison, Iowa

[21] Appl. No.: 923,929

[22] PCT Filed: Feb. 28, 1991

[86] PCT No.: PCT/US91/01304

§ 371 Date: Sep. 1, 1992

§ 102(e) Date: Sep. 1, 1992

[87] PCT Pub. No.: WO91/12730

PCT Pub. Date: Sep. 5, 1991

Related U.S. Application Data

[63] Continuation-in-part of Ser. No. 789,306, Nov. 8, 1991, which is a continuation of Ser. No. 487,739, Mar. 2, 1990, abandoned.

[51] Int. Cl.⁶ .......................... C07K 3/02; C07K 3/26; C07K 15/10; C08B 30/02
[52] U.S. Cl. ...................... 530/372; 127/67; 530/373; 530/374; 530/375; 530/376; 530/414; 530/427; 536/128
[58] Field of Search ............... 530/370, 372, 373, 374, 530/375, 376, 414, 427; 536/127, 128; 127/67

[56] References Cited

U.S. PATENT DOCUMENTS 4,163,010  7/1979  Garbuit ................ 426/656
4,332,719  6/1982  Lawhon et al. ........... 530/370
4,517,022  5/1985  Harvey ................... 127/68
4,624,805 11/1986  Lawhon ................. 530/376
4,677,065  6/1987  Büchbjerg et al. ......... 435/68.1
4,716,218 12/1987  Chen et al. ............. 530/374
4,770,710  9/1988  Friedman et al. .......... 127/67

FOREIGN PATENT DOCUMENTS 733437  7/1955  United Kingdom .

OTHER PUBLICATIONS

Brock et al, "Biology of Microorganisms", 4th ed., published 1984 by Prentice-Hall, Inc. (Englewood Cliffs), pp. 110, 729.

P. E. Newmann et al, "Chemical and Physical Properties of Proteins in Wet-Milled Corn Gluten"; no date; pp. 353-356.

Perry's Chemical Engineers' Handbook, 6th Ed.; Green et al, eds. McGraw-Hill Book Co. 1984; pp. 17-51 through 17-54.

Primary Examiner—Jeffrey E. Russel
Attorney, Agent, or Firm—Rhodes, Coats & Bennett

[57] ABSTRACT

The protein/starch bond is broken mechanically by wet attrition milling rather than by cooking or with chemicals alone. The grain particles are milled to a particle size sufficiently small to break the bond between starch and protein and sufficiently large to retain substantially all of the starch granules intact. The protein is then extracted with ethanol and alkali solvents, separated and dried to form protein and/or protein isolate. The intact starch granules are cleaned and dried.

35 Claims, 1 Drawing Sheet

RECOVERY OF PROTEIN, PROTEIN ISOLATE AND/OR STARCH FROM CEREAL GRAINS

REFERENCE TO RELATED APPLICATIONS

This application is a continuation-in-part of my U.S. application Ser. No. 07/789,306, filed Nov. 8, 1991, which is a continuation of U.S. application Ser. No. 487,739, filed Mar. 2, 1990, now abandoned, entitled Method of Producing Protein and Protein Isolates from Cereal Grains.

FIELD AND BACKGROUND OF THE INVENTION

This invention relates generally to the production of protein or protein isolates and/or starch from cereal grains. In particular, this invention relates to a technique in which the bond between starch, on the one hand, and protein on the other is broken mechanically rather than by the conventional process of cooking. As a result, there is realized an increased recovery of a higher quality protein and intact granules of a higher quality pure starch.

It has been proposed heretofore to obtain a protein isolate from corn or other cereal grains. As is well known to nutritionists, agricultural commodities, such as cereal grains, may contain complete or nearly complete proteins and thus, if the protein were isolated, would be capable of providing a balanced diet for humans.

Heretofore, the extraction of isolated proteins from agricultural commodities has been made difficult by the chemical bonding which exists between protein and the starch constituents of the commodities. In prior, well known processes which involve some biochemical treatment or steps using one of these constituents, such as the yeast fermentation of corn or grains to produce ethanol, the starch/protein bond is broken by hydrolysis through cooking. However, breaking the bond by cooking, while making the starch and sugar content available for other uses, destroys the possibility of recovering the protein in a form useful as food.

James T. Lawhorn proposed, in U.S. Pat. No. 4,624,805, that, after an initial grinding step in which the grain is ground to "meal" size (250-600 microns), protein be isolated prior to the use of starches and sugars in an ethanol fermentation process. The protein is extracted with an alkali/alcohol solution either with or without sonification. Lawhorn teaches that the protein is recovered by ultrafiltration, with the dissolved sugars and starches in a permeate being concentrated by reverse osmosis for use in alcohol production.

It has been discovered by attempts to practice the Lawhorn process that the process as disclosed in the patent simply does not work on a commercial scale. First, by relying on chemicals and sonification to break the protein/starch bond, only minimal percentages of the available protein is extracted. Secondly, the ultrafiltration membranes described by Lawhorn foul and clog, and the desired continuous operation does not occur. However, the Lawhorn process does propose the separation of protein and other components of agricultural commodities by a process which avoids cooking and thereby would permit the recovery of a food graded protein isolate, if it worked on a commercial scale.

On a dry basis, the endosperm of corn makes up approximately 83% of the kernel and contains the bulk of the starch. Other cereal grains may vary somewhat in percentages of endosperm but are conceptually similar. The starch is present as granules of roughly 5-35 microns in size with the space therebetween filled with protein. This protein/starch matrix has to be broken to be able to recover either or both starch or protein. Intact starch granules are much more valuable than starch granules which are not intact. It should be noted that the structure of the granules themselves depends on the way in which amylose and amylopection are associated by intermolecular hydrogen bonds. Strong bonds give rise to crystalline areas and weak bonds to amorphous areas. Normal corn starch has a crystallinity in the range of 15-39%.

In the known processes for separating protein from starch, either the usefulness of protein and starch have been destroyed by the cooking and/or steeping process, or else the protein has been ineffectively recovered in the Lawhorn process. In my prior application Ser. No. 487,739, now abandoned, while a technique for mechanically breaking the starch/protein matrix, the starch granules are generally not left intact. Therefore, a process which effectively recovers quality protein and maintains starch granules intact has not been heretofore accomplished.

BRIEF DESCRIPTION OF THE INVENTION

With the foregoing in mind, the present invention reduces the grain kernels to particles of an optimum size to be treated more effectively with a solvent to extract the protein from the starch. Toward this end, it has been found experimentally that particle sizes in the range of 1-100 microns realize enhanced recovery of the available protein (greater than 80%). Further, after subsequent microfiltration, the end product has a protein concentration of over 90%, qualifying it as protein isolate, a much more valuable type of protein suitable for use in baby food, food for the elderly, as a fortifying agent for snack food, milk shakes, nutritional drinks, pizza, and the like, as well as a substitute yeast in hamburger meat.

It has also been determined that if such particle sizes are in the higher end of the acceptable range (35-100 microns), all of the starch granules may remain intact, which makes them more valuable, as they are suitable for new industrial and commercial uses such as, for example, in biodegradable plastics, surgical dusting powders, antiperspirant sprays, disposable sanitary products, instant laundry starches and others. Other applications are also envisioned where cross-linking for instance overcomes the sensitivity of the granules to disruption and improves the strength of swollen granules.

In the process of the present invention, the grain is first subjected to a dry milling process to reduce the particle size to a range that can be easily introduced to the second operation after defatting: disk attrition wet milling. It is in this operation that the starch/protein matrix is broken. In the attrition mill (Koruma, for example), two carborundum disks are used, one stationary and one rotating at a high speed. The dry ground kernels are fed in aqueous slurry form through the center of the upper disk, and grinding occurs in the horizontal plane between the disks. The clearance between the disks is adjustable, as well as the rate of feed. Thus, the particle size can be closely controlled. The clearance between mill disks, speed of feed, and pumping pressure are adjusted to yield in conjunction with sufficient feed pressure, particle sizes of 1–50 microns, if the resulting starch is to be used in the production of ethanol where disruption of the starch granule is not a factor. However, where it is desirable to maintain the starch granule intact, the spacing between the disks should be above the particle size of the largest granules (between 35 and 100 microns and preferably approximately 50 microns). It is desired to set spacing between the disks at slightly above the largest particle size expected (depending on the type of grain being processes.

After the conventional extraction phase in which one or more solvents are added, and after settling (with or without centrifugation), the clear supernatant containing the protein is decanted and the starch cake remains. The starch cake is washed to remove further protein and then slurried in water and cleaned up in a set of hydroclones in which all non-starch particles are separated. Thereafter the slurry is centrifuged to 40–70% by weight dry solids and dried in a flash dryer or drum dryer or other dryer. The pH is reduced to 6–7 with hydrochloric or other acid. The end result is a high quality pure starch of intact granules.

The protein containing supernatant is processed through a continuous cross-flow microfilter having inorganic membranes. Preferably the membranes are aluminum oxide or other inorganic membranes. (Note that there are also presently being developed but not yet commercially available some forms of organic membranes which may become available in the future.) The pH of the protein or protein isolate is reduced to any desired value through diafiltration with deionized water, which simultaneously increases the purity.

Protein isolate is that material which has a protein purity of 90% or more. Protein purity below 90% is considered to be protein concentrate. In corn, for example, the available protein is made up of approximately 10% albumins and globulins (soluble respectively in water and neutral salt solutions), 35+% glutelins (soluble in alkali) and 50+% prolamines (mainly zein and soluble in high ethanol concentrations). The system of the present invention recovers most of the prolamines and glutelins, as well as some of the globulins. The overall extraction efficiency of protein is greater than 80%.

With the foregoing in mind, it is an object of this invention to isolate from cereal grains the food value protein and starch present while enabling the maximum recovery of other useful by-products. In realizing this object, the starch constituents are separated from the protein constituents mechanically in a two-step grinding process. In the first step, the kernels are subjected to a dry milling operation in which the kernels are broken down to a particle size on the order of 5/64" or less in diameter. There follows a wet attrition milling process which reduces the particle size of the commodity to a very fine range. During this operation, the protein/starch matrix is broken resulting in a more efficient extraction of protein.

A further object of this invention is to produce protein isolate from corn or other grain while enabling use of the remaining constituents of the corn or other grain in further process which yield useful by-products, such as bacterial or yeast fermentation. In realizing this object of the present invention, the separation of protein and other constituents is accomplished while avoiding cooking of the agricultural commodity which would otherwise limit the usefulness of the constituents of the commodity.

Yet another object of this invention is to separate the protein and starch constituents of cereal grains in such a manner that the protein recovery is maximized without destroying the integrity of the starch granules.

In the case of corn, current varieties conventionally processed are normally deficient in lysine and tryptophan. A high lysine corn is known (Crow's Opaque 2) which is only slightly deficient in tryptophan. However, new varieties of corn will become available soon with high protein content and all eight amino acids essential for human nutrition present in sufficient quantities to meet FAO/WHO standards. While the process to be described hereinafter will work with any variety of corn, it is contemplated as being most useful with such high protein content, essentially complete protein corn.

BRIEF DESCRIPTION OF THE DRAWINGS

Some of the objects of the invention having been stated, other objects will appear as the description proceeds, when taken in connection with the accompanying drawing in which a schematic flow diagram of the process of this invention is shown.

DETAILED DESCRIPTION OF THE INVENTION

Figure 1:
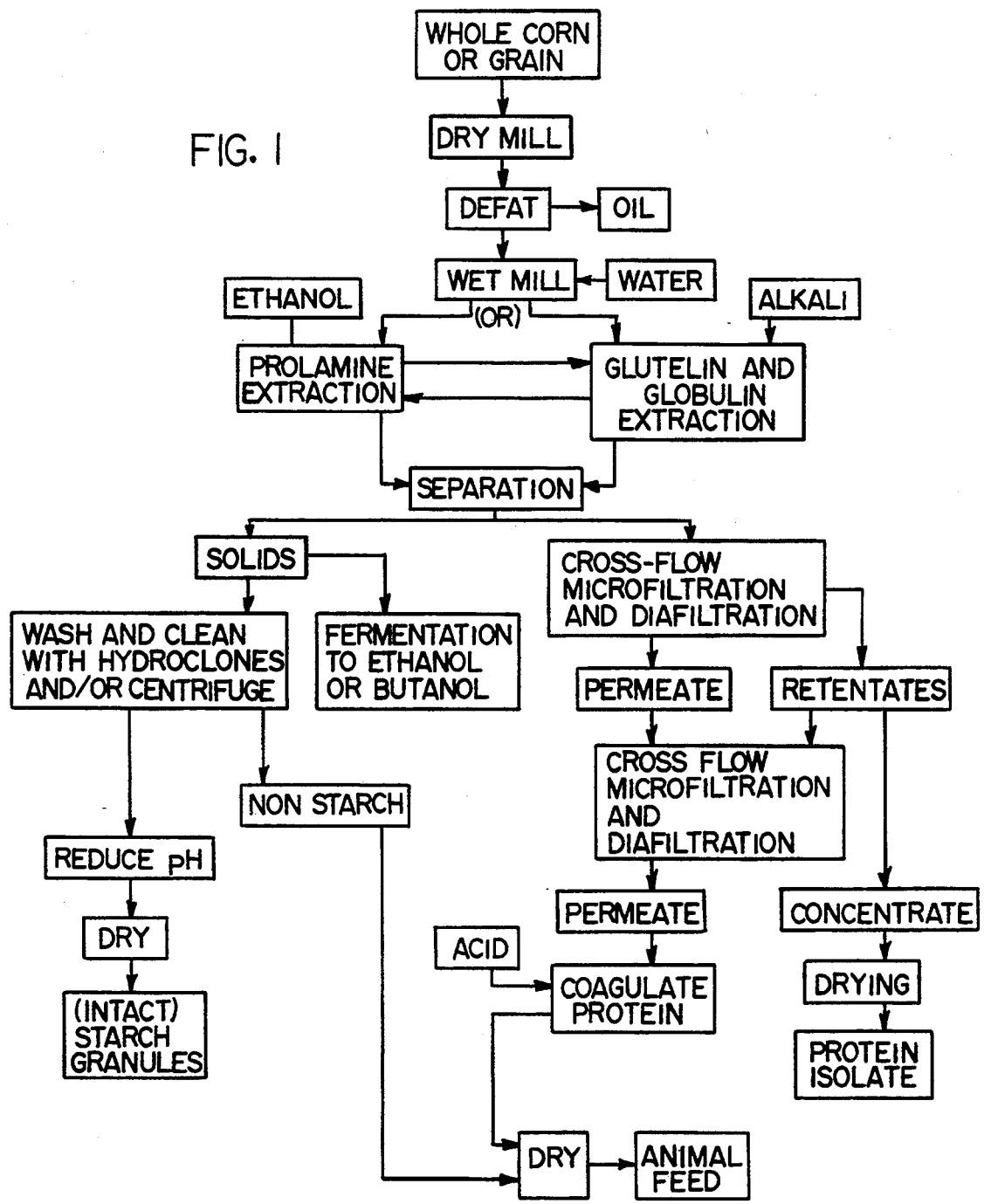

While the present invention will be described more fully hereinafter with reference to the accompanying drawing, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting as in the present invention.

A process for isolating protein from an agricultural commodity such as cereal grains in accordance with this invention preferably begins with a suitable commodity which contains all eight essential amino acids in sufficient quantities to provide a complete protein as understood in accordance with the standards of the Food and Agricultural Organization of the United Nations. Such a commodity may be whole corn or some other cereal grain or vegetable matter. Such vegetable matter, or a suitable grain, is provided as the first step in the process, indicated at 10 in the drawing. It is contemplated that the process may possibly be practiced with other commodities which might supply less than complete protein. However, the maximum benefit is to be obtained where the commodity used does provide a complete protein, and thus that is the preferred practice of this invention. As will be appreciated, the process may begin with whole corn, in which event protein is produced from both the germ and endosperm, or with degerminated corn. Generally, a protein isolate produced from the germ alone will be a better quality isolate.

The corn (in the preferred practice) or other grains or vegetable matter is first dry ground in a hammer mill or the like to a particle size of from about one sixteenth inch to three sixteenth inch nominal diameter. The ground corn is now defatted. The ground and defatted corn or other particulate vegetable matter containing bound-together protein and starch is then mixed with water to form a slurry in which the vegetable matter constitutes up to at least about 35 percent of the slurry by weight. The slurry is then fed to a special attrition mill for wet grinding which reduces the particles to a size in the range of 1–100 microns such that the bond between starch and protein constituents is broken mechanically. A suitable mill is manufactured by Koruma Maschinenbau of the Federal Republic of Germany and sold for use in the cosmetic and drug industries. Such a mill also disperses the vegetable oils contained in the starting vegetable matter, such as corn oil, if not removed, to such an extent that no serious membrane fouling of significance occurs in subsequent process steps to be described hereinafter. Both wet and dry milling can proceed at essentially ambient room temperatures. In cases where the starch constituent is to be used for the production of ethanol, the spacing between the disks of the mill, the pumping pressure, and the speed of the feed are adjusted to yield particles in the range of approximately 1–10 microns. Where intact starch granules are desired, the parameters are adjusted to yield particles in the range of 35–100 microns.

After wet milling, the slurry is subjected to protein extraction. The specific sequence of the protein extraction steps may vary depending upon the specific nature of the starting vegetable matter, and the person of skill in the applicable arts practicing this invention will discover that, as starting materials vary from those described here as most preferred, at least certain process variables must be varied to maximize yields. Attention will be directed to some of these matters hereinafter.

In the presently preferred form of this invention, the temperature of the slurry is raised to about 125° Fahrenheit for the extraction steps which follow. Such heating will be a side effect of the wet milling and/or may be accomplished by supplying heat to the slurry. It should be noted that prior to the step of adding alcohol, which will be discussed below, the temperature of the slurry is adjusted to about 125° Fahrenheit, and the temperature of the slurry and the high liquid content portion thereof is maintained within 5 degrees of 125° Fahrenheit throughout the process. Temperatures much above 125° will result in denaturing the proteins rendering the process ineffective for recovering high quality protein with good functionality.

In the preferred process, a two-step extraction technique is utilized. The first step of extraction involves the solubilization of the glutelins. This step involves adjusting the pH of the slurry to a range of from about 9 to about 12 by the addition of a suitable alkali. The step of adjusting the pH may comprise adding at least one of sodium hydroxide and potassium hydroxide in a quantity sufficient for adjusting the pH of the slurry to the specified range. Where it is important that a low sodium end product be obtained, then potassium hydroxide is the preferred agent. The slurry is agitated during the addition of the pH adjusting hydroxide.

The pH adjusted water/corn slurry is then allowed to dwell while being agitated for a predetermined interval of time to allow for the solubilization of glutelin. A residence time of from thirty to sixty minutes is generally sufficient.

In the second step, the slurry is then stirred and sufficient alcohol (preferably ethanol) is added to achieve a solution in which the ethanol constitutes at least about 50% of the slurry by weight. The upper limit of alcohol content preferably is not more than 80% by weight.

The alcohol/water/corn slurry is then allowed to dwell while being agitated for a predetermined interval of time. At this point in the process, the prolamines or zein containing proteins enter solution. A residence time of from thirty to sixty minutes is generally sufficient. However, the slurry may be allowed to dwell for a time interval ranging from about thirty minutes to about two hours, during which time the slurry is agitated.

These two steps for extracting prolamines and glutelins and globulins may, with some starting vegetable matter, produce a higher yield of end product if reversed in sequence. That is, while the preferred sequence for a high lysine corn is as described hereinabove, it is contemplated that other starting materials may provide a higher yield if the first extraction is for glutelin and the second for prolamines. Further, while here described as two separate and sequential steps, it may be possible with some materials to essentially combine the two treatment steps and permit only a single period of residence or resting for extraction of all proteins.

During the extraction steps in the process for producing protein and intact starch granules and cereal grains, the temperature is maintained within 5 degrees of 125° F. Further, the slurry is permitted to dwell for an interval of time in the range of from about thirty minutes to about two hours, during which time the slurry is agitated.

In any event, the steps of extraction are followed by a step of separating the slurry into two portions, a high solids content portion and a high liquids content portion. The two portions are here described in that manner out of a recognition that it is not easily possible to complete the entire separation into wet and dry portions in a single step. Thus any attempt to separate solids from the slurry will of necessity carry a small quantity of liquids, and vice versa. The separation should be by settling, possibly with the use of aids such as biopolymers and rapid settling equipment, and may be with the further aid of devices such as a centrifuge. The high liquid portion, or supernatant, is withdrawn following the separation process.

The withdrawn supernatant contains the proteins which are in the process of becoming separated, and is next purified in a cross-flow microfiltration step with inorganic or organic membranes. At the present time, an inorganic membrane, namely aluminum oxide, is preferred. This microfiltration yields a retentate with a high purity protein content, which upon undergoing diafiltration will yield protein isolates with purities exceeding 90%. The zeta-potential of the aluminum oxide membrane is zero around pH 8–9, and of the prevailing high pH-values of 9–12, both the membrane and the proteins are charged negatively, thus repelling one another and yielding the retentate as being the product. The retentate is then concentrated until the degree of concentration is acceptable for spray drying or some other drying procedure which will yield a dry powder isolate useful as a foodstuff or food supplement. A liquid protein concentrate or isolate may also be produced for use in, for instance, nutritional beverages or pharmaceutical applications.

Alternatively, after separating the high liquid content portion and the high solids content portion, the high liquid content portion is centrifuged at a g-force in the range of 10,000–15,000×g to recover dispersed particulate matter.

After recovery of the ethanol solvent before or after microfiltration, for concentration and recycling, the high solids content portion of the slurry is concentrated and, where ethanol is the desired end product, then passed to a fermentation process as a feedstock. The fermentation process may be any of those known to persons skilled in the applicable arts, including a bacterial fermentation process for the production of butanol or a yeast fermentation process for the production of ethanol. Such processes and their other by-products being known from other disclosures, they will not be here discussed at length. The fermentation process may be concluded with distillation or with other separation procedures such as pervaporation to yield the product streams desired.

Alternatively, when intact starch granules is the desired end product, the high solids content portion of the slurry is washed, cleaned, dried, and the pH reduced to approximately 6.

If the corn or other starting material used has an incomplete amino acid balance, it is, of course, possible to add some natural or synthetic amino acid of the deficient type to bring the end product into appropriate balance. Such additions may be made to the dry isolate powder along with any other materials necessary or appropriate for flowability, handling or the like. In regular corn, the ethanol soluble protein fraction is larger than the alkali soluble fraction, with the two together making up some 80–90% of the total protein of the corn. In a high lysine corn, the Opaque 2 gene changes both proportions of these protein fractions as well as the lysine content within the various protein groups. It is for this reason that, with various starting materials, various process parameters must be adjusted to optimize the yield obtained from the particular starting material.

EXAMPLE I

In development of this invention, a quantity of Crow's high lysine corn was ground in a roller mill to a particle size of about one sixteenth inch and six pounds of such dry ground corn was mixed with 5.1 liters of pure water to form a slurry. The corn contained 9.5% moisture and 8.56% protein, thus starting the example with 233 grams of protein in the slurry. The slurry is then passed through an attrition mill where the corn was further ground to a sufficiently small particle size (approximately 1–50 micron) that the bond between the protein and starch in the starch/protein matrix was broken. The slurry was stirred, heated to 125° Fahrenheit, the pH adjusted to 11.4 with NaOH, and sufficient ethanol added to increase the total volume to 18 liters. The slurry was agitated for thirty-five minutes for protein extraction, and was then allowed to settle for two hours, fifteen minutes. Subsequently, the pH of the resulting slurry was adjusted to about 8 by adding sulfuric acid. Careful decantation yielded over 10 liters of supernatant containing 18.9 g/L of protein (an 82% extraction), which was then fed to a microfiltration module. The microfiltration module was equipped with a 0.2 micron aluminim oxide membrane. During filtration, temperature was maintained at 123° Fahrenheit and feed pump pressure at about 90 psig. The cross-velocity was 8.36 M/sec and average transmembrane pressure was about 60 psig. An 18 second backwash with 120° water at pH 12 was applied every four minutes. The flux obtained was 170 L/M$^2$/H. The retentate from the process contained 5.8 g/L of protein with a purity of 75%. The remaining impurities were minerals and some fat which were removed by dialysis to bring the protein purity to 90.4%. The retentate was then concentrated to about 50 g/L in a rotary vacuum evaporator and spray dried to form a powder isolate with about 12% moisture content and over 90% purity. A small amount of a silica based antistatic agent was added to facilitate the spray drying step. After the process was completed, the filter membrane was regenerated to achieve the same flux using water as had been the case prior to the process illustrated.

A later study with defatted (as described in Example II) corn resulted in the extraction of 83.4% of the protein originally present in the corn in the two-step extraction process (60 minutes at 125° F. and pH 11.6; 60 minutes at 125° F. and 68% v/v ethanol). After settling and centrifugation of the supernatant (15 minutes at 15,100×g) a 68.2% pure protein solution was obtained. Following microfiltration with a 0.2 micron aluminum oxide membrane and backflush with compressed air plus diafiltration with 5.6 times the original volume of feed as DI-water, the retentate yielded a 98% purer protein isolate at pH 6.9. Spray drying resulted in a 98% pure protein isolate with 7.1% moisture.

EXAMPLE II 13 pounds of whole corn (hi-ly Opaque 2 from Crow) with 8.5% (weight to weight) protein on an as is basis were ground in a hammer mill with a 5/64" screen. Total available protein was thus 502 grams.

The corn was defatted with n-hexane under high vacuum in a modified Crown Iron Works machine at temperatures not exceeding 52° C. (125.6° F.) so as not to denature the protein. Ethanol or other solvents may be used for the defatting operations. The ground and defatted corn was mixed with deionized water into a 31 weight % slurry, which was then milled in a Koruma attrition mill to a particle size of 50–100 microns. In doing so, the protein/starch matrix was broken.

Next, under continuous stirring and at temperatures not exceeding 125° F., the protein was extracted in a two-step process. In the first step, the pH was raised to 11.3 with sodium hydroxide and a 45 minute extraction time allowed. In the second step, ethanol was added to a final concentration of 60% by volume and another 45 minute extraction time allowed. The mixture was allowed to settle for 2 hours, and the supernatant decanted.

A total of 82.1% of the available protein had been obtained in solution. Of the supernatant, 12.0 liters were centrifuged at 17,000×g. The centrate contained 17.43 g/kg of total solids with 10.97 g/kg of total protein (determined as total Kjeldahl nitrogen times 6.25). Its purity was 62.9%. There followed cross-flow microfiltration and dialysis with a 0.2 micron aluminum oxide membrane (Alcoa) yielding retentate (product in this case) of 6.5 liters with 15.58 g/kg of total solids and 14.08 g/kg of protein. Hence, the purity was 90.4%. The pH of the retentate was 7.3 after 63.6 liters of DI-water were used for dialysis. This product was spray dried concurrently at exit temperatures of 218° F., yielding a fluffy powder with 8.0% moisture.

The protein in the permeate was not recovered here, however, that may be done in a second cross-flow microfiltration unit having a membrane with a smaller pore size. Utilizing a 100 Angstrom aluminum oxide membrane, a total of approximately 85% of the protein in the feed was recovered. Depending upon the protein content and make-up of the protein in the corn, from three to over four pounds of protein isolate product may be produced per bushel. The product pH may be at or near neutral. By controlling the purity through diafiltration until the proper pH (an almost linear relationship) is obtained, products with different functionalities may be produced. Functional properties as viscosity, water and oil absorption, gel strength, emulsification, solubility, wettability, etc. can be varied this way.

The starch is cleaned and dried (spray dried). Due to the mild processing conditions, the starch granules are still intact. This is determined by electron microscopy, x-ray diffraction, digital scanning calorimetry, electron microscopy and Congo red application to a sample under a microscope. Such intact starch granules are appropriate raw material for new biodegradable plastics which will contain up to 75% starch. It may be used to produce pyrodextrins. It may be cross-linked to overcome the sensitivity of the granules to disruption while it improves the strength of the swollen granules. This way it can be used in surgical dusting powders, disposable sanitary products, antiperspirant sprays, etc. It may be extruded to yield instant laundry starches or pregelatinized for specialty food applications, etc.

As will be understood, the present invention has disclosed processes capable of producing protein isolates, intact starch granules, and other by-products. The other products include butanol, ethanol, corn oil, dietary fiber, etc. and are produced by applying otherwise known technology. In the drawing and specifications, there has been set forth a preferred embodiment of the invention and, although specific terms are used, the description thus given uses terminology in a generic and descriptive sense only and not the purposes of limitation.

What is claimed is:

1. A process for recovering protein from cereal grains containing starch and protein bound into a matrix, the process comprising the steps of:
   grinding said grains to a particle size appropriate for introduction to a wet attrition mill;
   defatting said grain;
   wet attrition milling particles of said grain to a size sufficiently small to break the bond between starch and protein, then
   extracting the broken bond protein from the starch with at least one solvent, then
   separating the resulting high liquid content portion containing the extracted protein from the resulting high solids content portion containing the starch, and then
   subjecting the high liquid content portion containing the extracted protein to continuous cross-flow microfiltration with inorganic membranes for isolating the protein constituent,
   concentrating the protein constituent into a dry powder.

2. A process for recovering protein from corn comprising the steps of:
   grinding said corn to a particle size appropriate for introduction to a wet attrition mill;
   defatting said corn;
   wet attrition milling particles of said corn to a size sufficiently small to break the bond between starch and protein, then
   extracting the broken bond protein from the starch with at least one solvent, then
   separating the resulting high liquid content portion containing the extracted protein from the resulting high solids content portion containing the starch, and then
   subjecting the high liquid content portion containing the extracted protein to continuous cross-flow microfiltration with inorganic membranes for isolating the protein constituent,
   concentrating the protein constituent into a dry powder.

3. A process according to one of claim 1 or claim 2 wherein the step of breaking by wet attrition milling comprises milling particles of grain or corn to the point that substantially none of the particles exceed 100 microns.

4. A process according to one of claim 1 or claim 2 further comprising the step of passing starch separated from the protein to a fermentation process as a feedstock.

5. A process according to claim 4 wherein said step of passing starch to a fermentation process comprises passing the starch to a bacterial fermentation process for the production of butanol.

6. A process according to claim 4 wherein said step of passing starch to a fermentation process comprises passing the starch to a yeast fermentation process for the production of ethanol.

7. A process for recovering protein from cereal grains comprising the steps of:
   grinding said grains to a particle size appropriate for introduction to a wet attrition mill;
   defatting said grain;
   adding water to ground particulate vegetable matter obtained from said cereal grains containing bound together protein and starch for making a first slurry in which the vegetable matter constitutes up to about 35 percent of the first slurry by weight,
   passing the first slurry through an attrition mill and grinding the particulate vegetable matter to a particle size effective to break, by physical action, the bond between protein and starch in the vegetable matter,
   adding alcohol to the milled slurry for making extraction slurry in which the alcohol constitutes at least about 50 percent of the extraction slurry be weight,
   adjusting the pH of the extraction slurry to a range of from about 9 to about 12,
   permitting the pH adjusted slurry to dwell for a sufficient time interval to cause solubilization of protein, then
   separating the pH adjusted slurry into high solids content and high liquid content portions,
   subjecting the high liquid content portion of the pH adjusted slurry which contains the solubilized protein to continuous cross-flow microfiltration with inorganic membranes for isolating the protein constituent, and then
   concentrating and drying the protein constituent in order to form a protein isolate.

8. A process for producing protein isolate from corn comprising the steps of:
   grinding corn to a particle size appropriate for defatting and the introduction to a wet attrition mill, then
   defatting said corn, then
   adding water to the ground corn particles for making a first slurry having corn constituting from about 30 to about 35 weight percent of the first slurry, passing the first slurry through a wet attrition mill and grinding the corn particles to a particle size effective to break the bond between protein and starch in the corn particles by physical actions, then adding alcohol to the milled slurry for making an extraction slurry in which the alcohol constitutes at least about 50 percent of the extraction slurry by weight, adjusting the pH of the extraction slurry to a range of from about 9 to about 12, permitting the pH adjusted slurry to dwell for a sufficient time interval to cause solubilization of protein, then separating the pH adjusted slurry into high solids content and high liquid content portions, subjecting the high liquid content portion of the pH adjusted slurry which contains the solubilized protein to continuous cross-flow microfiltration with inorganic membranes for isolating the protein constituent, and then concentrating and drying the protein constituent in order to form a protein isolate.

9. A process according to one of claim 7 or claim 8 wherein said step of adjusting the pH of the extraction slurry to a range of from about 9 to about 12 comprises adding an alkali.

10. A process according to claim 9 wherein the step of adjusting the pH comprises adding a quantity of at least one of sodium hydroxide and potassium hydroxide in a quantity sufficient for adjusting the pH of the extraction slurry to said range.

11. A process according to claim 10 wherein said step of adding a quantity of at least one of sodium hydroxide and potassium hydroxide further comprises agitating the slurry while adding the pH adjusting hydroxide.

12. A process according to one of claim 7 or claim 8 further comprising the step of adjusting the pH of the slurry to about 8 after passage of said sufficient time interval.

13. A process according to claim 12 wherein said step of adjusting the pH of the slurry to about 8 comprises adding a quantity of sulfuric acid sufficient for adjusting the pH of the slurry to about 8.

14. A process according to one of claim 7 or claim 8 wherein said step of grinding to a particle size effective to break, by physical action, the bond between protein and starch comprises grinding to the point that substantially none of the particles exceed 100 microns.

15. A process according to one of claim 7 or claim 8 further comprising, prior to the step of adding alcohol, the step of adjusting the temperature of the slurry to about 125° Fahrenheit and maintaining the temperature of the slurry and the high liquid content portion thereof within five degrees of 125° Fahrenheit throughout the process.

16. A process according to one of claim 7 or claim 8 wherein said step of permitting the slurry to dwell for a sufficient time interval comprises permitting the slurry to dwell for an interval in the range of from about thirty minutes to about two hours and agitating the slurry during the interval of dwell.

17. A process according to one of claim 7 or claim 8 further comprising the step of passing starch separated from the protein isolate to a fermentation process as feedstocks.

18. A process according to claim 17 further comprising the step of passing starch to a bacterial fermentation process for the production of butanol.

19. A process according to claim 17 further comprising the step of passing starch to a yeast fermentation process for the production of ethanol.

20. A process for producing protein isolate from high lysine corn, comprising the steps of:

grinding high lysine corn having prolamine, glutelin, sugar and starch constituents into particles appropriate for defatting and the introduction to a wet attrition mill, then defatting the corn;

adding water to the ground corn particles for making a slurry having corn particles constituting from about 30 to about 35 weight percent of the slurry;

passing the slurry through an attrition mill and grinding the corn particles to a sufficiently fine particle size to mechanically break the chemical bond between the prolamine and glutelin and starch constitutents by physical action; then extracting the prolamine and glutelin constituents of the corn from the attrition milled particles into a solution; then separating the milled slurry into a high solids content portion containing starch and a high liquid content portion which contains the extracted prolamine and glutelin constituents of the corn;

subjecting the high liquid content portion of the milled slurry to continuous cross-flow microfiltration with inorganic membranes for isolating the protein constituents; and then concentrating and drying the protein constituents to form the protein isolate.

21. A process for producing protein and intact starch granules from cereal grains, comprising the steps of:

a) grinding the cereal grain to a particle size in the range of from about one-sixteenth to about three-sixteenths-inch nominal diameter;

b) defatting said grain;

c) adding water to the ground grain particles for making a slurry in which the grain constitutes from about 25% to about 35% by weight of the slurry;

d) passing the slurry through a wet attrition mill and further milling the ground grain particles to a particle size sufficiently small to break the bond between starch and protein and sufficiently large to retain substantially all of the starch granules intact by physical actions;

e) adding alcohol to the milled slurry for making an extraction slurry in which the alcohol constitutes at least about 50% of the extraction slurry by weight;

f) adjusting the pH of the extraction slurry to a range of from about 9 to about 12;

g) permitting the pH adjusted slurry to dwell for a sufficient interval to cause solubilization of protein;

h) separating the resulting high liquid content portion containing the extracted protein and the resulting high solids content portion containing the starch granules;

i) subjecting the high liquid content portion which contains the solubilized protein to cross-flow microfiltration with inorganic membranes for isolating the protein constituent;

j) concentrating and drying the protein constituent in order to form a protein product; and k) cleaning and drying the starch granules.

22. The process according the claim 21 wherein the step of adjusting the pH of the slurry to a range of from about 9 to about 12 comprises adding alkali.

23. The process according the claim 22 wherein said step of adjusting the pH of the slurry to a range of from about 9 to 12 comprises adding at least one of sodium hydroxide and potassium hydroxide in a quantity sufficient for adjusting the pH of the slurry to the specified range.

24. The process according to claim 21 wherein in the step of defatting the cereal grain, the temperatures do not exceed 52° C.

25. The process according the claim 23 wherein after step (g) the pH of the slurry is further adjusted to about 8 by adding a quantity of sulfuric acid sufficient for adjusting the pH of the slurry to about 8.

26. The process according to claim 21 wherein said particle size is obtained by setting the discs of the wet attrition mill with a spacing in the range of about 35–100 microns.

27. The process according to claim 21 wherein said particle size is obtained by setting the discs of said wet attrition mill with a spacing in the range of about 50–100 microns.

28. The process according to claim 21 wherein, after the cleaning and drying step, the pH of the starch granules is reduced to approximately 6.

29. The process according the claim 21 wherein during the extraction steps set forth in sub-paragraphs (e)-(g) the temperature is maintained within 5° of 125° Fahrenheit.

30. The process according to claim 21 wherein said step of permitting the slurry to dwell for a sufficient time interval comprises permitting the slurry to dwell for an interval of time in the range of from about 30 minutes to about 2 hours and agitating the slurry during the interval of dwell.

31. The process according to claim 21 and further after step (h) centrifuging the high liquid content portion of the slurry at a g-force in the range of 10,000–15,000×g to recover dispersed particulate matter.

32. The process according to claim 21 wherein the cross-flow microfiltration step includes diafiltration in conjunction therewith.

33. A process for producing protein isolate from cereal grains containing starch and protein bound into a matrix, comprising the steps of:
grinding the grain to a particle size in the range of from about one-sixteenth to about three-sixteenths-inch nominal diameter;
defatting the ground grain particles;
adding water to the ground grain particles for making a first slurry having grain constituting up to about 35 weight % of the first slurry;
passing the first slurry through a wet attrition mill and grinding the grain particles to a particle size effective to break the bond between protein and starch in the grain by physical actions;
adding alcohol to the milled slurry for making an extraction slurry in which the alcohol constitutes at least about 50% of the extraction slurry by weight;
adjusting the pH of the extraction slurry to a range of from about 9 to about 12;
permitting the pH adjusted slurry to dwell for a sufficient time interval to cause solubilization of protein;
separating the resulting slurry into high solids content and high liquid content portions;
subjecting the high liquid content portion of the resulting slurry which contains the solubilized protein to microfiltration and diafiltration for isolating the protein constituent;
concentrating and drying the protein constituent in order to form a protein isolate.

34. The process according to claim 33 wherein said step of wet attrition milling to a particle size effective to break, by physical action, the bond between protein and starch comprises milling to the point that substantially none of the particles exceed 100 microns.

35. The process according to claim 33 wherein said step of microfiltration and diafiltration comprises subjecting the high liquid content portion of the slurry which contains the solubilized protein to a cross-flow microfiltering unit with inorganic membranes.

* * * * *